US010872478B2

(12) United States Patent
Nyalamadugu et al.

(10) Patent No.: US 10,872,478 B2
(45) Date of Patent: *Dec. 22, 2020

(54) EMBEDDED ON-BOARD DIAGNOSTIC (OBD) DEVICE FOR A VEHICLE

(71) Applicant: Neology, Inc., San Diego, CA (US)

(72) Inventors: Sheshi Nyalamadugu, San Diego, CA (US); Joe Mullis, Oceanside, CA (US); Alexander Boellaard, Ernst (NL); Birektawit Waktola, Port Charlotte, FL (US); Raymond Freeman, Mesa, AZ (US)

(73) Assignee: NEOLOGY, INC., San Diego, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/059,419

(22) Filed: Aug. 9, 2018

(65) Prior Publication Data

US 2018/0365912 A1 Dec. 20, 2018

Related U.S. Application Data

(63) Continuation of application No. 15/265,726, filed on Sep. 14, 2016, now Pat. No. 10,049,510.

(Continued)

(51) Int. Cl.
*G07C 5/08* (2006.01)
*G07C 5/00* (2006.01)
*G06K 7/10* (2006.01)

(52) U.S. Cl.
CPC ....... *G07C 5/0808* (2013.01); *G06K 7/10366* (2013.01); *G07C 5/008* (2013.01); *G07C 2205/02* (2013.01)

(58) Field of Classification Search
CPC .. G07C 5/0808; G07C 5/008; G07C 2205/02; G06K 7/10366
See application file for complete search history.

(56) References Cited

U.S. PATENT DOCUMENTS 3,220,899 A 11/1965 Leonard
4,560,445 A 12/1985 Hoover et al.
(Continued)

FOREIGN PATENT DOCUMENTS

CH 691098 4/2001
DE 19608757 9/1997
(Continued)

OTHER PUBLICATIONS

European Search Report for EP 02724551.3 dated Apr. 1, 2005, (7 pages).

(Continued)

*Primary Examiner* — Michael D Lang
(74) *Attorney, Agent, or Firm* — Procopio, Cory, Hargreaves & Savitch LLP (57) ABSTRACT

Embodiments described herein provide various examples of a low cost, low power, fully automated, unobtrusive, and vehicle-independent radio frequency (RF) communication device to be plugged into a standard on-board diagnostic (OBD) port inside a vehicle to access OBD diagnostic data. According to one aspect, an OBD device for a vehicle is disclosed. This OBD device includes: an OBD adapter configured to be plugged into an OBD port of a vehicle and a first RFID module electrically coupled to the OBD adapter. The first RFID module is further configured to receive OBD data of a vehicle from an associated OBD port via the OBD adapter and communicate at least a portion of the received OBD data to a first RFID reader when the first RFID module is queried by the first RFID reader.

21 Claims, 5 Drawing Sheets

Related U.S. Application Data (60) Provisional application No. 62/218,518, filed on Sep. 14, 2015.

(56) References Cited

U.S. PATENT DOCUMENTS

| | | |
|---|---|---|
| 4,610,755 A | 9/1986 | Beckett |
| 4,682,852 A | 7/1987 | Weber |
| 4,727,360 A | 2/1988 | Ferguson et al. |
| 4,728,962 A | 3/1988 | Kitsuda et al. |
| 5,046,792 A | 9/1991 | Zabka |
| 5,115,182 A | 5/1992 | Ehmke et al. |
| 5,396,559 A | 3/1995 | McGrew |
| 5,408,243 A | 4/1995 | D'Hont |
| 5,477,219 A | 12/1995 | Zarembo et al. |
| 5,528,222 A | 6/1996 | Moskowitz et al. |
| 5,557,279 A | 9/1996 | D'Hont |
| 5,608,417 A | 3/1997 | De Vall |
| 5,621,571 A | 4/1997 | Bantli et al. |
| 5,682,143 A | 10/1997 | Brady et al. |
| 5,710,458 A | 1/1998 | Iwasaki |
| 5,724,410 A | 3/1998 | Parvulescu et al. |
| 5,757,521 A | 5/1998 | Walters et al. |
| 5,847,931 A | 12/1998 | Gaumet et al. |
| 5,894,268 A | 4/1999 | McLaren |
| 5,940,006 A | 8/1999 | MacLellan et al. |
| 5,945,938 A | 8/1999 | Chia et al. |
| 5,973,600 A | 10/1999 | Mosher, Jr. |
| 6,018,298 A | 1/2000 | Endo et al. |
| 6,018,299 A | 1/2000 | Eberhardt |
| 6,025,784 A | 2/2000 | Mish |
| 6,031,458 A | 2/2000 | Jacobsen et al. |
| 6,052,068 A | 4/2000 | Price et al. |
| 6,107,920 A | 8/2000 | Eberhardt et al. |
| 6,118,379 A | 9/2000 | Kodukula et al. |
| 6,121,880 A | 9/2000 | Scott et al. |
| 6,133,836 A | 10/2000 | Smith |
| 6,157,333 A | 12/2000 | Louagie et al. |
| 6,167,333 A | 12/2000 | Gehlot |
| 6,175,922 B1 | 1/2001 | Wang |
| 6,201,474 B1 | 3/2001 | Brady et al. |
| 6,203,952 B1 | 3/2001 | O'Brien et al. |
| 6,211,790 B1 | 4/2001 | Radomsky et al. |
| 6,222,453 B1 | 4/2001 | Joyce |
| 6,265,977 B1 | 7/2001 | Vega et al. |
| 6,268,796 B1 | 7/2001 | Gnadinger et al. |
| 6,269,292 B1 | 7/2001 | Kokubu et al. |
| 6,276,607 B1 | 8/2001 | Sato |
| 6,334,059 B1 | 12/2001 | Stilp et al. |
| 6,427,504 B1 | 8/2002 | Janssen et al. |
| 6,608,911 B2 | 8/2003 | Lofgren et al. |
| 6,617,961 B1 | 9/2003 | Janssen et al. |
| 6,653,946 B1 | 11/2003 | Hassett |
| 6,698,653 B1 | 3/2004 | Diamond et al. |
| 6,758,405 B2 | 7/2004 | Look |
| 6,894,615 B2 | 5/2005 | Look |
| 6,950,013 B2 | 9/2005 | Scaman et al. |
| 7,031,946 B1 | 4/2006 | Tamai et al. |
| 7,034,688 B2 | 4/2006 | Rietzler et al. |
| 7,080,819 B2 | 7/2006 | Tojo |
| 7,164,387 B2 | 1/2007 | Sievenpiper |
| 7,463,150 B2 | 12/2008 | Rajan |
| 7,533,809 B1 | 5/2009 | Robinson et al. |
| 7,925,399 B2 | 4/2011 | Comeau et al. |
| 8,041,815 B2 | 10/2011 | Bahl et al. |
| 8,095,154 B1 | 1/2012 | Wang et al. |
| 2002/0011933 A1 | 1/2002 | Andersen et al. |
| 2002/0089434 A1 | 7/2002 | Ghazarian |
| 2002/0129488 A1 | 9/2002 | Lieberman |
| 2003/0067389 A1 | 4/2003 | Look |
| 2004/0085244 A1 | 5/2004 | Kadambi et al. |
| 2004/0089707 A1 | 5/2004 | Cortina et al. |
| 2004/0095241 A1 | 5/2004 | Maloney |
| 2004/0214642 A1 | 10/2004 | Beck |
| 2005/0010478 A1 | 1/2005 | Gravelle |
| 2005/0035915 A1 | 2/2005 | Livingston et al. |
| 2005/0099306 A1 | 5/2005 | Gilfix et al. |
| 2005/0099307 A1 | 5/2005 | Gilfix et al. |
| 2005/0149764 A1 | 7/2005 | Bahl et al. |
| 2005/0167497 A1 | 8/2005 | Fujii |
| 2005/0222961 A1 | 10/2005 | Staib et al. |
| 2006/0187063 A1 | 8/2006 | Rietzler et al. |
| 2006/0229978 A1 | 10/2006 | Popovic et al. |
| 2006/0261950 A1 | 11/2006 | Arneson et al. |
| 2006/0278704 A1 | 12/2006 | Saunders et al. |
| 2007/0027924 A1 | 2/2007 | Hopkins |
| 2007/0035400 A1 | 2/2007 | Lauper |
| 2007/0067290 A1 | 3/2007 | Makela |
| 2007/0171077 A1 | 7/2007 | Kawarizadeh |
| 2007/0228140 A1 | 10/2007 | Kumagai et al. |
| 2007/0285256 A1 | 12/2007 | Batra |
| 2008/0042848 A1 | 2/2008 | Roberts et al. |
| 2008/0074264 A1 | 3/2008 | Sharpe et al. |
| 2008/0084275 A1 | 4/2008 | Azevedo et al. |
| 2008/0191878 A1 | 8/2008 | Abraham |
| 2008/0314971 A1 | 12/2008 | Faith et al. |
| 2009/0021379 A1 | 1/2009 | Zhu et al. |
| 2009/0058647 A1 | 3/2009 | Dennard et al. |
| 2009/0066516 A1 | 3/2009 | Lazo |
| 2009/0113513 A1 | 4/2009 | Dorney |
| 2009/0174365 A1 | 7/2009 | Lowenthal et al. |
| 2009/0262716 A1 | 10/2009 | Kawakami |
| 2010/0090004 A1 | 4/2010 | Sands et al. |
| 2010/0207737 A1 | 8/2010 | Park et al. |
| 2010/0214187 A1 | 8/2010 | Sugita et al. |
| 2010/0222041 A1 | 9/2010 | Dragt |
| 2011/0112717 A1 | 5/2011 | Resner |
| 2011/0254687 A1 | 10/2011 | Arponen et al. |
| 2012/0019363 A1 | 1/2012 | Fein |
| 2012/0026582 A1 | 2/2012 | Okabe et al. |
| 2012/0171995 A1 | 7/2012 | Krafzik et al. |
| 2012/0194330 A1 | 8/2012 | Nguyen |
| 2012/0203441 A1 | 8/2012 | Higgins |
| 2012/0258627 A1 | 10/2012 | Huang |
| 2012/0317628 A1 | 12/2012 | Yeager |
| 2012/0323767 A1 | 12/2012 | Michael |
| 2012/0326847 A1 | 12/2012 | Strauman |
| 2013/0103519 A1 | 4/2013 | Kountotsis et al. |
| 2013/0119135 A1 | 5/2013 | Gauthier et al. |
| 2013/0246135 A1 | 9/2013 | Higgins |
| 2014/0012458 A1 | 1/2014 | Park |
| 2014/0207309 A1 | 7/2014 | Armitage et al. |
| 2015/0317841 A1 | 4/2015 | Evans |
| 2015/0103504 A1 | 7/2015 | Silva |
| 2015/0228127 A1 | 8/2015 | Ross |

FOREIGN PATENT DOCUMENTS

| | | |
|---|---|---|
| DE | 10042805 | 3/2002 |
| EP | 0977145 | 2/2000 |
| JP | 401147078 | 6/1989 |
| JP | 2000-085278 | 3/2000 |
| JP | 5464011 | 10/2011 |
| KR | 1020110116886 | 10/2011 |
| KR | 101232237 | 2/2013 |
| KR | 1020130097349 | 9/2013 |
| WO | 9843104 | 10/1998 |
| WO | 9967815 | 12/1999 |
| WO | 0042472 | 7/2000 |

OTHER PUBLICATIONS

Extended European Search Report issued by the European Patent Office in related European Application No. 10182033.0 dated Jan. 13, 2012 (7 pages).

International Preliminary Report on Patentability, PCT/US2016/051782, dated Mar. 20, 2018, (13 pages).

International Search Report and Written Opinion, received in corresponding International Application No. PCT/US2014/034050, dated Aug. 25, 2014, (8 pages).

International Search Report and Written Opinion received in PCT/US2014/050973, dated Oct. 29, 2014, (6 pages).

International Search Report for PCT/IB02/01439 dated Dec. 18, 2002, (5 pages).

(56) References Cited

OTHER PUBLICATIONS

International Preliminary Report on Patentability, PCT/IB02/01439, dated May 6, 2005, (11 pages).
Supplementary European Search Report for EP Application No. 14782712.5 (7 pages).
Extended European Search Report issued by the European Patent Office in related European Application No. 16847254.6 dated Mar. 27, 2019 (9 pages).

EMBEDDED ON-BOARD DIAGNOSTIC (OBD) DEVICE FOR A VEHICLE

PRIORITY CLAIM AND RELATED PATENT APPLICATIONS

This patent document is a Continuation Application of U.S. patent application Ser. No. 15/265,726 filed on Sep. 14, 2016 entitled "EMBEDDED ON-BOARD DIAGNOSTIC (OBD) DEVICE FOR A VEHICLE" which claims benefit of priority under 35 U.S.C. 119(e) to U.S. Provisional Patent Application No. 62/218,518 entitled "ON-BOARD DEVICE" and filed on Sep. 14, 2015. The disclosures of the above application are incorporated by reference in their entirety as a part of this document.

The present application is related to U.S. Pat. No. 8,344,890, issued on Jan. 1 2013, U.S. Pat. No. 9,007,215, issued on Apr. 14, 2015, U.S. Pat. No. 7,081,819, issued on Jul. 25, 2006, U.S. Pat. No. 7,671,746, issued on Mar. 2, 2010, U.S. Pat. No. 8,237,568, issued on Aug. 7, 2012, U.S. Pat. No. 8,325,044, issued on Dec. 4, 2012, U.S. Pat. No. 8,004,410, issued on Aug. 23, 2011, Reissued U.S. Pat. Nos. RE 43,355, issued on May 8, 2012 and RE 44,691, issued on Jan. 7, 2014, U.S. patent application Ser. No. 14/459,299, filed on Aug. 13, 2014, now U.S. Pat. No. 9,355,398, issued on May 31, 2016 and U.S. patent application Ser. No. 14/250,356, filed on Apr. 10, 2014, U.S. Pat. No. 7,034,688, issued on Apr. 25, 2006 and U.S. Pat. No. 7,463,154, issued on Dec. 9, 2008, all which are hereby incorporated by reference in their entirety.

BACKGROUND

1. Technical Field

The various embodiments described herein are related to wireless devices, and more particularly to an on-board diagnostic (OBD) device with wireless capability which may be used inside a vehicle.

2. Related Art

Since 1996, new cars sold in the United States have included an On-Board Diagnostic (OBD) port/connector which is designed to allow a standardize way to access a vehicle's diagnostic information. Various types of communication devices and gadgets have been designed or adapted to access vehicle's internal sensor data via the OBD port using either wired or wireless connections to the OBD port. These devices coupled to the OBD ports facilitate vehicle self-diagnostics and self-report capabilities. In addition to the convenience of easily understanding the root causes of vehicle's warning signals, such as a lit check-engine light, these devices can turn the routine diagnostic information into a resource to enable a wide range of useful applications. For example, the obtained diagnostic information can be turned into driving habit data to allow an insurance company to adjust a drive's insurance rate based on how a person drives. As another example, the obtained diagnostic information can be displayed in real-time to the driver and when coupled with the GPS data, allowing the driver to monitor and visualize the sophisticated performance parameters of the vehicle traveling in a particular route.

Conventionally, a user device, such as a diagnostic tool or a user's smartphone can be configured to communicate with the OBD port through a wireless connection, such as a cellular data connection (e.g., in the M2M solution), Wi-Fi, or Bluetooth™. However, each of the above wireless connection technologies is associated with high power consumption and high cost.

SUMMARY

Embodiments described herein provide various examples of a low cost, low power, fully automated, unobtrusive, and vehicle-independent radio frequency (RF) communication device to be plugged into a standard OBD port inside a vehicle to access OBD diagnostic data of the vehicle. This device is also referred to as an "on-board diagnostic (OBD) device." In various embodiments, the disclosed OBD device can be embedded into any vehicle including a standard OBD port/connector, and be configured to access OBD diagnostic data through the standard OBD port/connector. In various embodiments, the disclosed embedded OBD device is configured to communicate with a radio frequency identification (RFID) reader infrastructure, including providing vehicle's OBD data to RFID readers of the RFID reader infrastructure, which can include both stationary and handheld RFID readers.

According to one aspect, an on-board diagnostic (OBD) device for a vehicle is disclosed. This OBD device includes: an OBD adapter configured to be plugged into an OBD port of a vehicle and a first RFID module electrically coupled to the OBD adapter. The first RFID module is further configured to: receive OBD data of a vehicle from an associated OBD port via the OBD adapter; and communicate at least a portion of the received OBD data to a first RFID reader when the first RFID module is queried by the first RFID reader.

In some embodiments, the first RFID module is an ultra-high frequency (UHF) RFID module configured to communicate with the first RFID reader using an UHF frequency band. The first RFID reader can be installed at a first location by the roadside, and in this configuration, the first RFID module can communicate with the first RFID reader when a vehicle carrying the OBD device passes through the first location. The first RFID reader can also be installed at a second location in a gantry above the ground, and in this configuration, the first RFID module can communicate with the first RFID reader when a vehicle carrying the OBD device passes under the second location. However, the first RFID reader can also be a handheld RFID reader.

In some embodiments, the OBD adapter of the OBD device is configured as a pass-through connector such that when the OBD adapter is plugged into an OBD port of a vehicle, the OBD adapter allows another ODB device to access the OBD port without obstruction. This can be achieved by configuring the pass-through connector with a pass-through port that is substantially identical to the OBD port, so that when the OBD adapter is plugged into the OBD port, another ODB device can continue to access the OBD port by plugging into the pass-through port.

In some embodiments, the first RFID module is configured as a passive RFID module which functions without requiring power from either a vehicle or the OBD device. This property allows the first RFID module to communicate with the first RFID reader when the OBD device is switched off or non-functional.

In some embodiments, the OBD device further includes a second RFID module electrically coupled to the OBD adapter. This second RFID module is further configured to: receive OBD data of a vehicle from an associated OBD port via the OBD adapter; and communicate at least a portion of the received OBD data to a second RFID reader when the second RFID module is queried by the second RFID reader. In some embodiments, the second RFID module is a high frequency (HF) RFID module configured to communicate with the second RFID reader using a HF frequency band. For example, the second RFID module can be configured to communicate with a near-field communication (NFC)-enabled device.

In some embodiments, the second RFID module is configured as a passive RFID module which functions without requiring power from either a vehicle or the OBD device. This property allows the second RFID module to communicate with the second RFID reader when the OBD device is switched off or non-functional.

In some embodiments, the OBD device also includes a microprocessor coupled between the OBD adapter and the first RFID module and configured to process the received OBD data via the OBD adapter. In some embodiments, the microprocessor is coupled to the first RFID module through an I²C control bus.

In some embodiments, the disclosed OBD device is configured to operate without requiring a network connection, a data service, or a pairing to another networked device.

In a further aspect, a process for providing OBD data of a vehicle to an RFID reader is disclosed. This process starts by receiving a query for OBD data from an RFID reader. Next, the process uses an UHF RFID module electrically coupled to an OBD port of the vehicle to receive the current OBD data of the vehicle. The process subsequently uses the UHF RFID module to transmit the current OBD data to the RFID reader.

In yet another aspect, a process for providing OBD data of a vehicle to an RFID reader is disclosed. This process starts by querying, from an OBD port of the vehicle, OBD data of the vehicle using an OBD adapter of an OBD device coupled with the OBD port. The process subsequently stores at least a portion of the received OBD data into a memory of the OBD device. Next, the process receives a query from an RFID reader for the OBD data of the vehicle. The process then uses an RFID module of the OBD device to transmit at least a portion of the stored OBD data to the RFID reader. In some embodiments, querying the OBD data and storing the at least a portion of the received OBD data into the memory of the OBD device are performed periodically at a predetermined time interval.

Other features and advantages of the present inventive concept should be apparent from the following description which illustrates by way of example aspects of the present inventive concept.

BRIEF DESCRIPTION OF THE DRAWINGS

The structure and operation of the present disclosure will be understood from a review of the following detailed description and the accompanying drawings in which like reference numerals refer to like parts and in which.

DETAILED DESCRIPTION

While certain embodiments are described, these embodiments are presented by way of example only, and are not intended to limit the scope of protection. The methods and systems described herein can be embodied in a variety of other forms. Furthermore, various omissions, substitutions, and changes in the form of the example methods and systems described herein can be made without departing from the scope of protection.

Embodiments described herein provide various examples of a low cost, low power, fully automated, unobtrusive, and vehicle-independent radio frequency (RF) communication device to be plugged into a standard OBD port inside a vehicle to access OBD diagnostic data of the vehicle. This device is also referred to as an "on-board diagnostic (OBD) device." In various embodiments, the disclosed OBD device can be embedded into any vehicle including a standard OBD port/connector, and be configured to access OBD diagnostic data through the standard OBD port/connector. In some embodiments, the disclosed embedded OBD device is configured to communicate with a radio frequency identification (RFID) reader infrastructure, including providing vehicle's OBD data to RFID readers of the RFID reader infrastructure, which can include both stationary and handheld RFID readers.

According to one aspect, an on-board diagnostic (OBD) device for a vehicle is disclosed. This OBD device includes: an OBD adapter configured to be plugged into an OBD port of a vehicle and a first RFID module electrically coupled to the OBD adapter. The first RFID module is further configured to: receive OBD data of a vehicle from an associated OBD port via the OBD adapter, and communicate at least a portion of the received OBD data to a first RFID reader when the first RFID module is queried by the first RFID reader.

In a further aspect, a process for providing OBD data of a vehicle to an RFID reader is disclosed. This process starts by receiving a query for OBD data from an RFID reader. Next, the process uses an UHF RFID module electrically coupled to an OBD port of the vehicle to receive the current OBD data of the vehicle. The process subsequently uses the UHF RFID module to transmit the current OBD data to the RFID reader.

Figure 1:
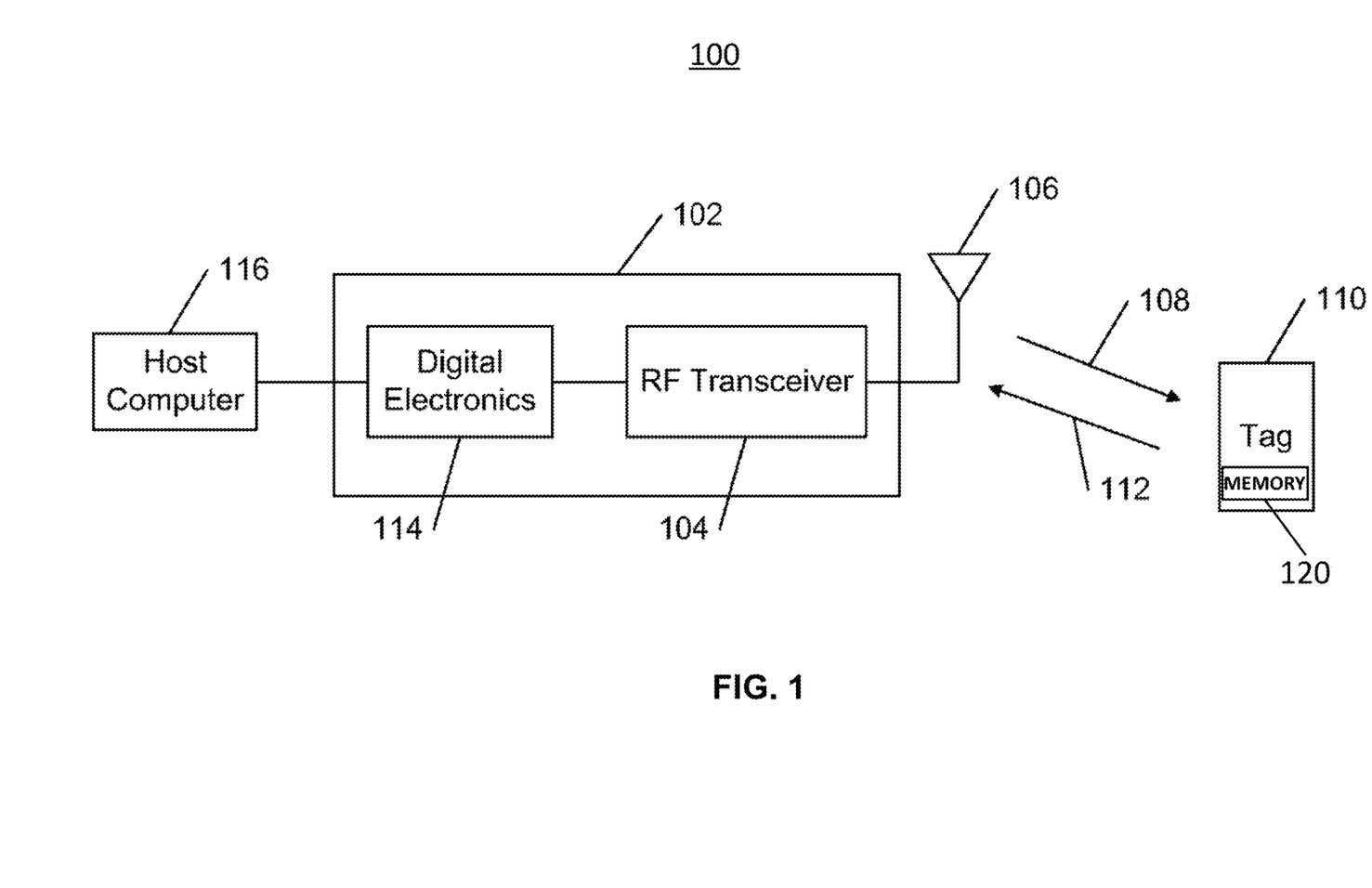
FIG. 1 shows a diagram illustrating an exemplary RFID system in accordance with one embodiment described herein.

In yet another aspect, a process for providing OBD data of a vehicle to an RFID reader is disclosed. This process starts by querying, from an OBD port of the vehicle, OBD data of the vehicle using an OBD adapter of an OBD device coupled with the OBD port. The process subsequently stores at least a portion of the received OBD data into a memory of the OBD device. Next, the process receives a query from an RFID reader for the OBD data of the vehicle. The process then uses an RFID module of the OBD device to transmit at least a portion of the stored OBD data to the RFID reader. In some embodiments, querying the OBD data and storing the at least a portion of the received OBD data into the memory of the OBD device are performed periodically at a predetermined time interval FIG. 1 shows a diagram illustrating an exemplary RFID system 100 in accordance with one embodiment described herein. In system 100, RFID interrogator/reader 102 communicates with one or more RFID tags 110. Data can be exchanged between interrogator/reader 102 and RFID tag 110 via radio transmit signal 108 and radio receive signal 112. RFID interrogator/reader 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or electrostatic coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner. Consequently, the range of transmit signal 108 determines the operational range of RFID tag 110. RFID tag 110 can includes a memory 120 to store tag information and/or application-specific data. Data stored on memory 120 can be read by RFID interrogator/reader 102 through radio transit signal 108. Moreover, memory 120 can be written and/or updated by RFID interrogator/reader 102 with data embedded in radio transit signal 108.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. In some embodiments, RFID tag 110 and RFID interrogator/reader 102 are not in a fixed configuration, for example, RFID tag 110 can be installed on a vehicle while RFID interrogator/reader 102 is installed near a toll booth and. In these embodiments, when RFID tag 110 passes within the range of the radio frequency magnetic field emitted by antenna 106 of RFID interrogator/reader 102, RFID tag 110 is excited and transmits data back to RF interrogator/reader 102. In other embodiments, RFID tag 110 and RFID interrogator/reader 102 are in a fixed configuration, for example, both RFID tag 110 and RFID interrogator/reader 102 can be installed on the same vehicle. In these embodiments, RFID tag 110 can be excited and transmit data back to RF interrogator/reader 102 when RFID interrogator/reader 102 is activated and begins to emit radio transit signal 108 through antenna 106. Alternatively, RFID tag 110 can be excited and allow data to be written into memory 120 when RFID interrogator/reader 102 is activated and begins to transmit data embedded in radio transit signal 108 through antenna 106.

In some implementations, in response to radio transit signal 108 transmitted by RF interrogator/reader 102 to access data stored on memory 120 of RFID tag 110, a change in the impedance of RFID tag 110 can be used to signal the data to RF interrogator/reader 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with RAM, performs decoding and reading of receive signal 112. Similarly, digital electronics 114 performs the coding of transmit signal 108. Thus, RF interrogator/reader 102 facilitates the reading or writing of data to RFID tags, e.g. RFID tag 110 that are within range of the RF field emitted by antenna 104. Together, RF transceiver 104 and digital electronics 114 comprise RF interrogator/reader 102. Finally, digital electronics 114 and can be interfaced with an integral display and/or provide a parallel or serial communications interface to a host computer or industrial controller, e.g. host computer 116.

In some embodiments, one or more RFID transponders (e.g., RFID tag 110 described with respect to FIG. 1) can be embedded in an OBD adaptor configured to be plugged into an OBD port/connector of a vehicle to form an embedded OBD device for a vehicle. In some embodiments, this embedded OBD device can be configured to access OBD data by querying an OBD port, such as a standard OBD-II of a vehicle, record at least a portion of the queried OBD data in a memory of the RFID transponder or a separate IC chip embedded in the OBD device, and transmit at least a portion of the queried OBD data to an RFID reader when the OBD device is queried by the RFID reader. In some embodiments, the OBD data queried by the OBD device which can then be transmitted to the RFID readers can include vehicle's VIN number, mileage, fuel level, tire pressure monitoring system (TPMS) threshold, and various diagnostic trouble codes.

Figure 2:
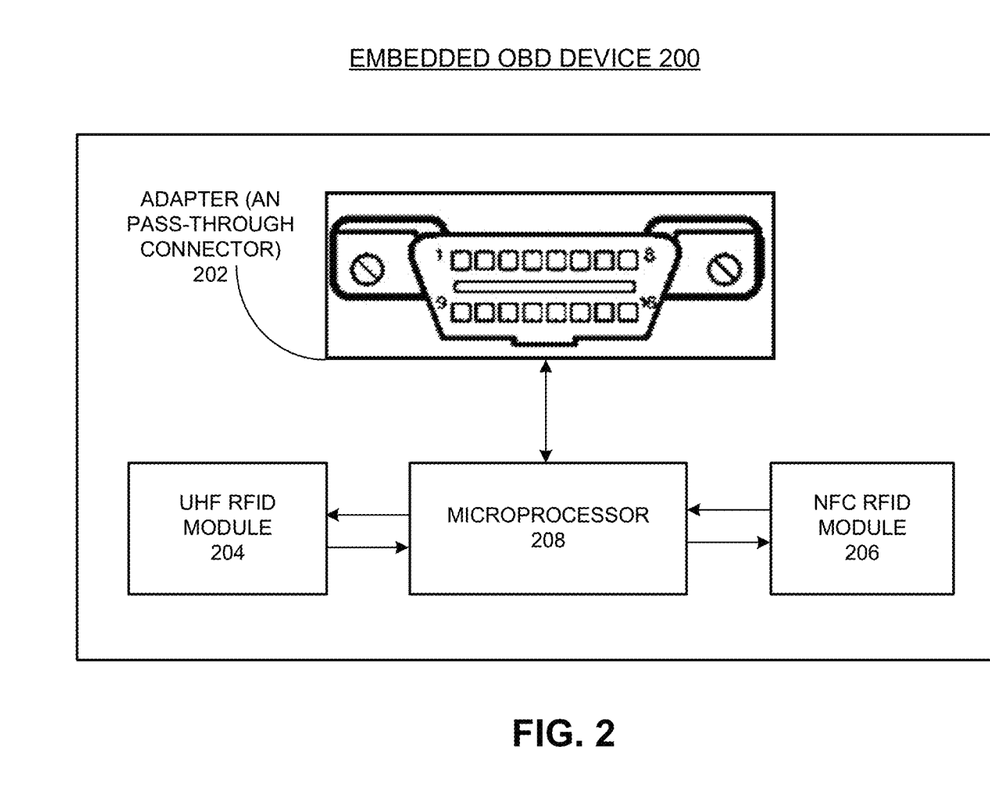
FIG. 2 shows a schematic diagram of an exemplary embedded OBD device in accordance with one embodiment described herein.

FIG. 2 shows a schematic diagram of an exemplary embedded OBD device 200 in accordance with one embodiment described herein. Embedded OBD device 200 can include an adapter 202. In various embodiments, adapter 202 includes a male/female connector to be plugged into a standard female/male OBD port, such as an OBD-II port. In some embodiments, adapter 202 is configured as a "pass-through connector" such that when OBD device 200 is plugged into a standard OBD port of a vehicle, adapter 202 allows another ODB device to continue to access the standard OBD port without obstruction. In some embodiments, adapter 202 is configured as the pass-through connector by including an outward-facing pass-through port/connector that is substantially identical to the original OBD port/connector, so that another ODB device can be plugged into the outward-facing port/connector of adapter 202 to continue to access the standard OBD port.

In some embodiments, OBD device 200 can include an ultra high frequency (UHF) Radio Frequency Identification (RFID) module 204 configured to allow OBD device 200 to communicate with RFID readers positioned from a mid-distance to a long distance from the location of OBD device 200 and an associated OBD port. For example, when OBD device 200 is embedded in a vehicle by plugging into the standard OBD port, UHF RFID module 204 is configured to communicate with RFID readers installed on the roadside when the vehicle passes through the RFID readers, or with RFID readers installed in a gantry under which the vehicle drives through. In some embodiments, UHF RFID module 204 can include an UHF integrated circuit (IC) chip and an UHF antenna/loop, wherein the UHF IC chip can include a memory and other circuits. Furthermore, the memory component of the UHF IC chip within UHF RFID module 204 can store data including, but are not limited to, parameters of OBD device 200, user and/or vehicle identity data (e.g., a VIN number), as well as OBD diagnostic data obtained via the OBD port. In some embodiments, the memory of UHF RFID module 204 includes a non-volatile memory.

UHF RFID module 204 can be configured as a passive module without requiring power from either the vehicle where OBD device 200 is installed or OBD device 200 itself. This feature can be useful when the vehicle is not in operation or when OBD device 200 is switched off or non-functional. In these scenarios, a passive UHF RFID module 204 can still be queries by an RFID reader within an UHF communication range of OBD device 200. However, UHF RFID module 204 can also be configured as an active or battery-assisted passive module without departing from the scope of present disclosure. In some embodiments, the communication between UHF RFID module 204 and the RFID readers is encrypted for secure and authorized communication.

In some embodiments, OBD device 200 can also include a short range high frequency (HF) RFID module 206 configured to allow OBD device 200 to communicate with a mobile device such as a smartphone or a tablet using the short range RF module. In particular embodiments, HF RFID module 206 includes a near field communication (NFC) RFID tag configured to communicate with a user's NFC-enabled mobile device. For example, when OBD device 200 is installed on a vehicle, an NFC RFID module 206 is configured to communicate with driver's smartphone or the on-board computer of the vehicle. In some embodiments, HF RFID module 206 can include an HF IC chip and an HF antenna/loop, wherein the IC chip can include a memory and other circuits. Furthermore, the memory component of the IC chip within HF RFID module 206 can store data including, but are not limited to, parameters of OBD device 200, user and/or vehicle identity data (e.g., a VIN number), as well as OBD diagnostic data obtained via the OBD port. In some embodiments, the memory of HF RFID module 206 includes a non-volatile memory.

HF RFID module 204 can be configured as a passive module without requiring power from either the vehicle where OBD device 200 is installed or OBD device 200 itself. This feature can be useful when the vehicle is not in operation or when OBD device 200 is switched off or non-functional. In these scenarios, a passive NFC RFID module 206 can still be queries by a user's NFC-enabled mobile device within a NFC communication range of OBD device 200. However, HF RFID module 206 can also be configured as an active or battery-assisted passive module without departing from the scope of present disclosure. In some embodiments, HF RFID module 206 can also be configured as a Bluetooth™ module or a Wi-Fi module.

Although the embodiment of OBD device 200 in FIG. 2 shows both an UHF RFID module 204 and an HF RFID module 206, other embodiments of the disclosed OBD device 200 can include just UHF RFID module 204 but without HF RFID module 206. In these embodiments, the exemplary OBD device 200 is not capable of communicating with a HF RFID reader or an NFC device. In other embodiments, an exemplary OBD device 200 can include one or more UHF RFID modules and one or more HF RFID modules.

OBD device 200 can also include a microprocessor 208 coupled between adapter 202 and UHF RFID module 204, and between adapter 202 and HF RFID module 206. Microprocessor 208 of the present disclosure can be any integrated circuit (IC) that is designed to execute instructions by performing arithmetic, logical, control and input/output (I/O) operations specified by algorithms. In some embodiments, microprocessor 208 is an application specific integrated circuit (ASIC) that is designed for a particular use rather than for general purpose use. In some embodiments, microprocessor 208 is configured to process the OBD diagnostic data received through adapter 202 and determine root causes of fault codes transmitted by the OBD port. In various embodiments, microprocessor 208 can be connected to the IC chip in UHF RFID module 204 and/or the IC chip in HF RFID module 206 through $I^2C$ control buses. In some embodiments, each of UHF RFID module 204, HF RFID module 206, and microprocessor 208 is a self-contained module which are separately manufactured and subsequently assembled into a single package. In other embodiments, UHF RFID module 204, HF RFID module 206, and microprocessor 208 are manufactured onto the same PCB.

Note that microprocessor 208 can receive power directly from one or more pins of adapter 202. However, microprocessor 208 can also receive power from a battery unit (not shown) integrated with OBD device 200. However, as mentioned above, each of the UHF RFID module 204 and HF RFID module 206 can be configured to be power-independent and continues to function when OBD device 200 is switched off or non-functional.

The disclosed embedded OBD device 200 is small (e.g., having a form factor comparable to the standard OBD port), unobtrusive (e.g., when configured in a pass-through configuration, keeps OBD port available), and invisible to the customers. In various embodiments, the disclosed OBD device 200 can be embedded into any vehicle including a standard OBD II port/connector or a variation of the standard OBD II port/connector, and be configured to access OBD diagnostic data through the standard OBD pins. Furthermore, the disclosed OBD device 200 can have a low installation cost because the installation process can be as easy as finding the vehicle's OBD port and plugging in the device. Because of using the standard interface and data protocol, the disclosed embedded OBD device 200 can also be transferred from one vehicle to the next by simply unplugging the device from one vehicle and plugging it into the next vehicle. In various embodiments, the disclosed embedded OBD device 200 is configured to communicate with an RFID reader infrastructure, which can include both stationary and handheld RFID readers.

Figure 3:
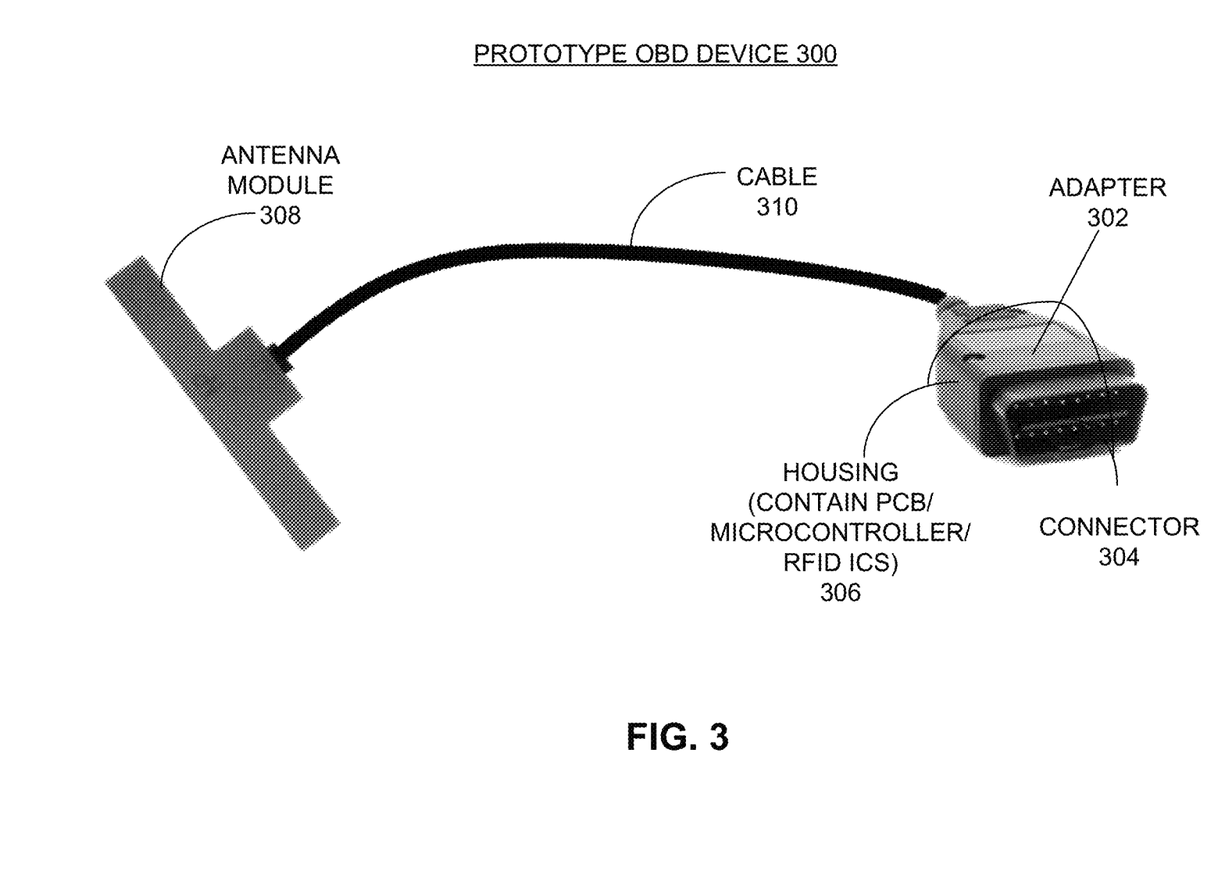
FIG. 3 presents a photographic image of a prototype OBD device in accordance with one embodiment described herein.

FIG. 3 presents a photographic image of a prototype OBD device 300 in accordance with one embodiment described herein. As can be seen in FIG. 3, prototype OBD device 300 includes an OBD adapter 302 which further includes a male connector 304 and a house 306 containing a PCB, a microcontroller and RFID chips (not shown). OBD device 300 also includes an antenna module 308 for the RFID module which is connected to adapter 302 via a cable 310. The particular configuration of OBD device 300 can facilitate performing read performance testing of OBD device 300 based on the position and location of OBD device 300 within the vehicle. The particular configuration of OBD device 300 can also facilitate testing of antenna module 308 in different shapes and sizes. Moreover, OBD adapter 302 of OBD device 300 can be an off-the-shelf component capable of accommodating a PCB for integrating the microcontroller and RFID chips. In some embodiments, the microcontroller inside adapter 302 stores an OBD device firmware configured to control desired device functionalities. For example, one of such device functionalities controlled by the firmware includes displaying the collected OBD data in a particular format.

Figure 4:
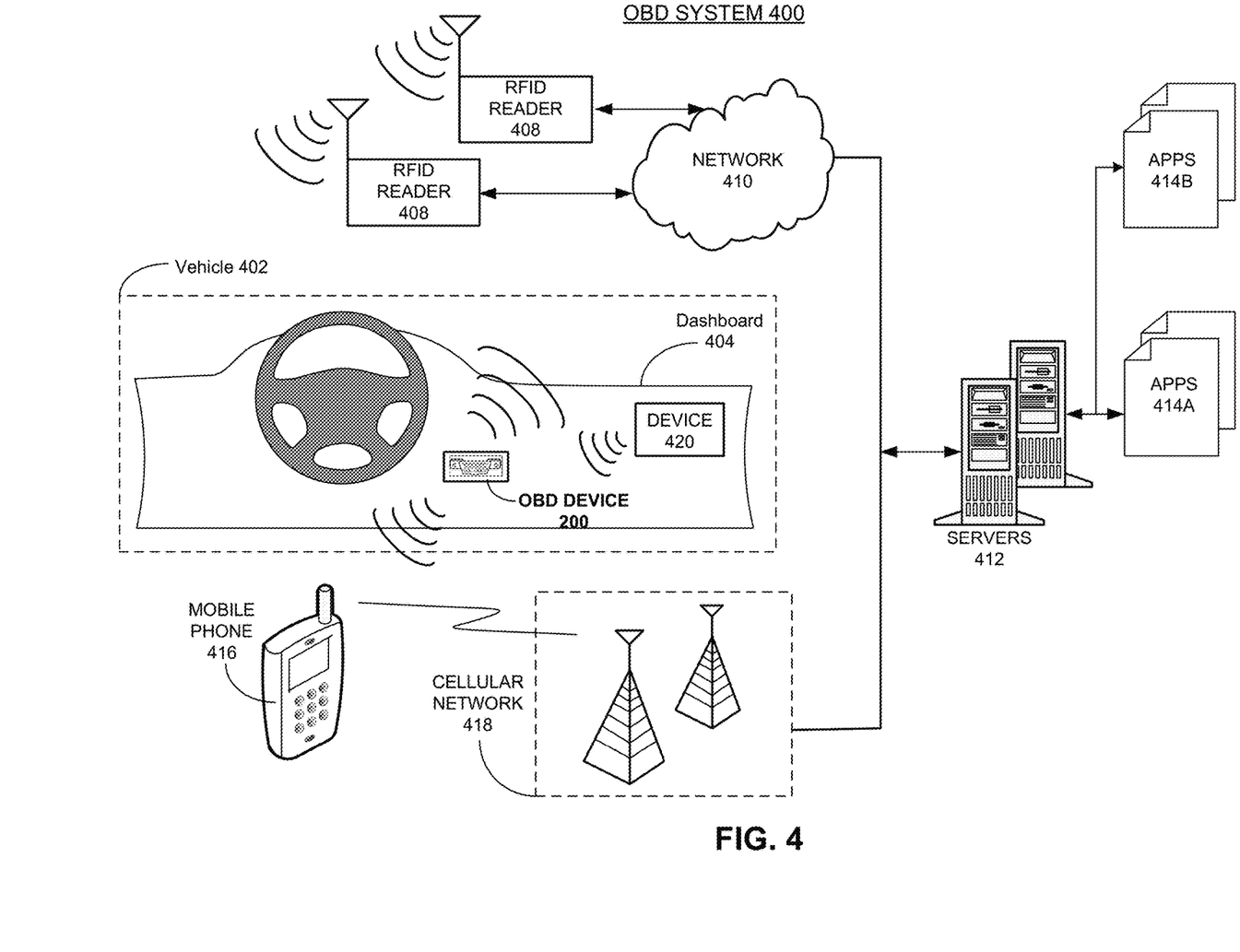
FIG. 4 shows a schematic diagram of an exemplary OBD system which uses the embedded OBD device described in FIG. 2 to query and transmit OBD data in accordance with one embodiment described herein.

FIG. 4 shows a schematic diagram of an exemplary OBD system 400 which uses the embedded OBD device 200 described in FIG. 2 to query and transmit OBD data in accordance with one embodiment described herein. In the system of FIG. 4, OBD device 200 is plugged into the standard OBD port (not shown) of vehicle 402 at a location within or behind dashboard 404. In other vehicles however, the standard OBD port is located at a location outside of the area of the dashboard. As mentioned above, adapter 202 within OBD device 200 can be configured as a pass-through connector to include an interface that is substantially identical to the standard OBD port/connector. Hence, when OBD device 200 is plugged into the OBD port of vehicle 402, this pass-through connector still allows other ODB devices to continue to access the OBD port without obstruction.

UHF RFID module 204 within OBD device 200 can communicate with a plurality of RFID readers 408 which can include readers installed by the roadside or handheld readers. In some embodiments, RFID readers 408 include both roadside readers and handheld readers. When RFID readers 408 are configured as roadside readers, RFID readers 408 can be installed as high as 200 feet if UHF RFID module 204 within OBD device 200 is configured in an active mode. RFID readers 408 can be connected to one or more back-end servers 412 via a network 410, which can be configured as one of the many network systems such as General Packet Radio Service (GPRS), Wi-Fi, or Ethernet. RFID readers 408 can stream OBD data received from OBD device 400 to back-end servers 412, which run various user applications 414A and 414B.

In some embodiments, UHF RFID module 204 within OBD device 200 can include two operations modes: a pass-through mode and a continuous collect mode. More specifically, in the pass-through mode, relevant OBD data received from the standard OBD port is transmitted to an RFID reader at the moment when OBD device 200 is queried by an RFID reader 408. In contrast, in the continuous mode, OBD device 200 queries the standard OBD port for relevant OBD data and subsequently stores the query results within a memory of OBD device 200. In some embodiments, the OBD data can include vehicle's VIN number, mileage, fuel level, tire pressure monitoring system (TPMS) threshold, and various diagnostic trouble codes. The query can be performed periodically at a predetermined time interval, e.g., every minute. Next, when OBD device 200 is queried by an RFID reader 408, OBD device 200 returns the OBD data stored in the memory to the RFID reader.

HF RFID module 206 within OBD device 200 can communicate with a user device such as a mobile phone 416 positioned inside vehicle 402. When HF RFID module 206 is configured as an NFC RFID module, HF RFID module 206 can communicate with an NFC interface of mobile phone 416. Mobile phone 416 can be connected to back-end servers 412 via a cellular network 418 and stream OBD data received from OBD device 200 to back-end servers 412 via cellular network 418.

One or more of the RFID modules within OBD device 200 can also interface with various sensors or devices installed on vehicle 402, such as device 420. In one embodiment, device 420 is an RFID-enabled license plate installed on vehicle 402. Embodiments of an RFID-enabled license plate are described in U.S. Pat. Nos. 8,344,890 and 9,007,215, the disclosures of which are incorporated by reference herein in their entirety.

In various embodiments, the disclosed OBD device 200 includes various secure features and implements various secure protocols. In some embodiments, unlike the conventional Bluetooth and Wi-Fi-based OBD systems, the disclosed OBD device 200 does not require a network connection, or a data service, or pairing to another networked device to operate. This independence from a network connection of the disclosed OBD device 200 can decrease the possibility of compromising the system 200 as a result of a network connection. In various embodiments, OBD device 200 is configured to query OBD data from the OBD port without the ability to access or make any changes to vehicle 402 parameters, or to "remotely control" any aspect of vehicle 402.

According to one exemplary embodiment, access to a memory of OBD device 200 is only granted by using one or more authorized security keys. The provision of secure identification solutions is described in U.S. Pat. Nos. 7,081,819, 7,671,746, 8,237,568, 8,322,044, and 8,004,410, the disclosures of which are incorporated by reference herein in their respective entirety.

As explained above, in some embodiments, OBD device 200 include two or more wireless modules configured to interface with corresponding systems at different frequencies, such as an UHF frequency and an NFC frequency. Multi-frequency RFID tags are described in Reissued U.S. Pat. Nos. RE 43,355 and RE 44,691, the disclosures of which are incorporated by reference herein in their respective entirety.

In some embodiments, OBD device 200 can be configured to allow one or more account management functions. Various account management applications for an RFID-enable license plate (or an "e-plate") are described in U.S. patent application Ser. No. 14/459,299 and U.S. patent application Ser. No. 14/459,299, the disclosures of which are incorporated herein by reference in their entirety.

The integration of one or more RFID transponders with an OBD device coupled onto the OBD port, in particular the inclusion of an UHF RFID transponder allows a wide range of useful applications to be built around the use of the OBD diagnostic data available at the OBD port. For example, in the rental car environment, traditional rental car return process is manually operated, labour intensive, timing consuming, error prone, and often resulting in poor customer experiences.

Figure 5:
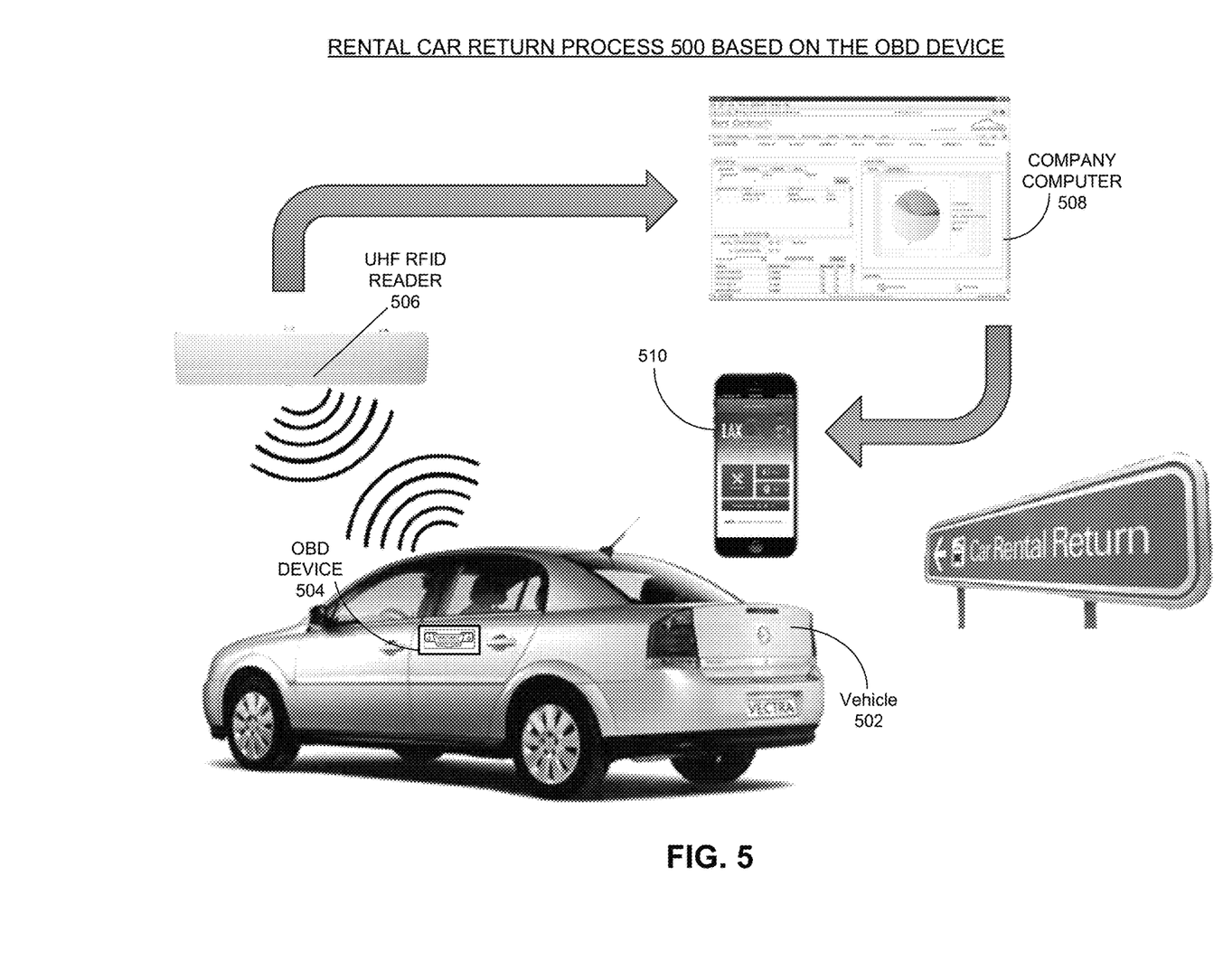
FIG. 5 illustrates a highly efficient rental car return process implemented based on communicating with a disclosed OBD device plugged into the OBD port of a rental vehicle in accordance with one embodiment described herein.

FIG. 5 illustrates a highly efficient rental car return process 500 implemented based on communicating with a disclosed OBD device plugged into the OBD port of a rental vehicle in accordance with one embodiment described herein.

As can be seen in FIG. 5, as vehicle 502 containing an embedded OBD device 504 enters a rental car return area, an UHF RFID reader 506 installed roadside or in a gantry directly accesses the relevant data by querying an UHF RFID transponder (not shown) within OBD device 504. Next, the query data, which can include fuel level, millage, and other information necessary to determine a final rental cost, can be forwarded to and displayed on an employee's computer 508. The rental cost and other return information can be automatically finalized or finalized with a minimum amount of human intervention. This check-out information can be generated before the driver even parks the car. With the exception of possibly a visual inspection by the employee, the rental return process can be completed before the driver even exits the vehicle.

In some embodiments, embedded OBD device 504 also includes a short range RFID transponder (not shown) which can allow the driver to verify and confirm the check-out information and provide payment. For example, once the employee finishes and confirms the check-out data, the final payment information can be sent to the driver's phone 510. The driver can view the payment information via an associated application, and also interface an NFC port of phone 510 with an NFC transponder of OBD device 504 to receive and confirm the check-out information. Driver can then provide payment using the same application. Alternatively, if the driver has an account set up with the rental company, the driver can use phone 510 to confirm the final payment, verify the account has adequate funds, or charge up the account if the fund is inadequate.

Hence, compared to the traditional rental car return operations, the OBD device-based rental car return process 500 is a data driven, automatic, high reliable and accurate, and instantaneous process. Additional benefits of automatic process 500 can include cost reduction (as a result of less devices and the elimination of receipt printing), no need to turn the vehicle on to check status on return, and obtaining instant ECU diagnostics data to ensure vehicle is running properly. Automatic process 500 is likely to improve customer experience, which in turn would allow more available resources to be used on customers and assets. Automatic process 500 based on using the disclosed OBD device can also allows the rental companies to use the vehicle data to drive loyalty, and to identify and reward more responsible and desirable customers (e.g. by offering responsible driver discounts).

Besides its applications in rental car business, the disclosed OBD device can also allow fleet management (e.g., for businesses operating a large fleet of vehicles) to be made more efficient via the use of the embedded UHF RFID capability. In a similar manner to the rental car return process 500, vehicle data can be read from the OBD devices at a distance as drivers of the fleet enter or exit parking structures, and/or when they drive pass certain roadside locations where UHF RFID readers are installed.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An on-board diagnostic (OBD) device for a vehicle, comprising:
   at least one memory configured to store OBD data of the vehicle received from an OBD port of the vehicle;
   a first radio frequency identification (RFID) tag electrically coupled to the at least one memory and configured to communicate at least a portion of the received OBD data to a first RFID reader when queried by the first RFID reader; and
   a second RFID tag electrically coupled to the at least one memory and configured to communicate the at least a portion of the received OBD data to a second RFID reader based in part on the first RFID tag communicating the at least a portion of the received OBD data to the first RFID reader,
   wherein at least one of the first RFID tag and the second RFID tag is configured as a passive RFID tag which functions without requiring power from either a vehicle or the OBD device.

2. The OBD device of claim 1, wherein the at least one memory comprises a first memory coupled to the first RFID tag and the second memory coupled the second RFID tag, each memory configured to store the OBD data of the vehicle received from the OBD port.

3. The OBD device of claim 1, wherein the first RFID tag is configured to communicate with the first RFID reader using a first frequency band and the second RFID tag is configured to communication with the second RFID reader using a second frequency band that differs from the first frequency band.

4. The OBD device of claim 1, wherein the first RFID tag is an ultra-high frequency (UHF) RFID tag configured to communicate with the first RFID reader using an UHF frequency band.

5. The OBD device of claim 1, wherein the second RFID tag is a high frequency (HF) RFID tag configured to communicate with the second RFID reader using a HF frequency band.

6. The OBD device of claim 1, wherein the second RFID tag is configured to communicate with a near-field communication (NFC)-enabled device by providing the at least a portion of the received OBD data to the NFC-enabled device.

7. The OBD device of claim 1, wherein the first RFID reader is positioned at a first location external to the vehicle and stationary relative to the ground, and wherein the first RFID tag is configured to communicate with the first RFID reader when a vehicle carrying the OBD device passes by the first location.

8. The OBD device of claim 1, wherein the first RFID reader is a handheld RFID reader.

9. The OBD device of claim 1, wherein the first RFID tag or the second RFID tag is configured to receive the OBD data of the vehicle when the respective RFID tag queries the OBD port.

10. The OBD device of claim 1, wherein the first RFID tag is configured as a passive RFID tag which functions without requiring power from either a vehicle or the OBD device, whereby allowing the first RFID tag to communicate with the first RFID reader when the OBD device is switched off or non-functional.

11. The OBD device of claim 1, wherein the second RFID tag is configured as a passive RFID tag which functions without requiring power from either a vehicle or the OBD device, whereby allowing the second RFID tag to communicate with the second RFID reader when the OBD device is switched off or non-functional.

12. The OBD device of claim 11, wherein the microprocessor is coupled to the first RFID module through an $I^2C$ control bus.

13. The OBD device of claim 1, further comprising an OBD adaptor configured to interface with the OBD port of the vehicle and coupled to the first and second RFID tags, wherein the OBD device further comprises a microprocessor coupled between the OBD adapter and the first RFID module and configured to process the received OBD data via the OBD adapter.

14. The OBD device of claim 1, wherein the OBD device is configured to operate without requiring a network connection, a data service, or a pairing to another networked device.

15. The OBD device of claim 1, wherein both of the first RFID tag and the second RFID tag are configured as a passive RFID tags.

16. An on-board diagnostic (OBD) device for a vehicle, comprising:
   at least one memory configured to store OBD data of the vehicle received from an OBD port of the vehicle;
   a radio frequency identification (RFID) tag electrically coupled to the at least one memory and configured to communicate at least a portion of the received OBD data to a first RFID reader when queried by the first RFID reader; and
   a wireless communication module comprising an antenna, the wireless communication module electrically coupled to the at least one memory and configured to communicate the at least a portion of the received OBD data to a second reader based in part on the RFID tag communicating the at least a portion of the received OBD data to the first RFID reader,
   wherein the OBD device is configured to operate in a pass-through mode and a continuous mode, wherein, in pass-through mode, the OBD data of the vehicle is retrieved via the OBD port and communicated to the first RFID reader automatically in response to the query from the first RFID reader and, in continuous mode, OBD data of the vehicle is stored in the at least one memory for subsequent communication to the first RFID reader when the first RFID tag is queried by the first RFID reader.

17. The OBD device of claim 11, wherein the communications module is one of a second RFID tag, a Bluetooth™ module, a Wi-Fi module, and an NFC module.

18. The OBD device of claim 16, in continuous mode, OBD data of the vehicle is retrieved from the OBD port periodically at a predetermined time interval.

19. A method for providing on-board diagnostic (OBD) data of a vehicle to a plurality of RFID readers, comprising:
   querying, from an OBD port of the vehicle, OBD data of the vehicle using an OBD device coupled with the OBD port;
   storing the received OBD data into a memory of the OBD device; and
   receiving a first query from a first RFID reader for at least a portion of the stored OBD data of the vehicle;
   transmitting the at least a first portion of the stored OBD data to the first RFID reader using a first RFID tag of the OBD device; and
   transmitting the at least a portion of the stored OBD data to a second RFID reader using a second RFID tag of the OBD device based in part on the first RFID tag transmitting the at least a portion of the stored OBD data to the first RFID reader, wherein at least one of the first RFID tag and the second RFID tag is configured as a passive RFID tag which functions without requiring power from either a vehicle or the OBD device.

20. The method claim 19, further comprising receiving a second query from the second RFID reader based in part on the first RFID tag transmitting the at least a portion of the stored OBD data to the first RFID reader.

21. An on-board diagnostic (OBD) system, the system comprising:
- an OBD device coupled to a vehicle, the OBD device comprising:
  - at least one memory configured to store OBD data of the vehicle received from an OBD port of the vehicle,
  - a first radio frequency identification (RFID) tag electrically coupled to the at least one memory and configured to communicate at least a portion of the received OBD data to a first RFID reader when queried by the first RFID reader, and
  - a second RFID tag electrically coupled to the at least one memory and configured to communicate the at least a portion of the received OBD data to a second RFID reader based in part on the first RFID tag communicating the at least a portion of the received OBD data to the first RFID reader, wherein at least one of the first RFID tag and the second RFID tag is configured as a passive RFID tag which functions without requiring power from either a vehicle or the OBD device;
- a computing device communicatively coupled to the first RFID reader, the first RFID reader configured to (i) query the first RFID tag for the at least a portion of the OBD data when the vehicle passes the by the first RFID reader, and (ii) forward the at least a portion of the OBD data to the computing device, the computing device configured to generate and transmit checkout information based on the received at least a portion of the OBD data; and
- a user device comprising the second RFID reader, the user device communicatively coupled to the computing device via a network and configured to receive the checkout information from the computing device, the second RFID reader configured to query the second RFID tag based on the received checkout information, and the user device configured to verify the received checkout information based on the at least a portion of the OBD data received from the second RFID tag.

* * * * *